US008666861B2

(12) United States Patent
Li et al.

(10) Patent No.: US 8,666,861 B2
(45) Date of Patent: Mar. 4, 2014

(54) SOFTWARE AND METHODS FOR RISK AND FRAUD MITIGATION

(75) Inventors: Caiwei Li, Fremont, CA (US); Christopher John Brocoum, San Francisco, CA (US); Lex Bayer, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 89 days.

(21) Appl. No.: 13/278,494

(22) Filed: Oct. 21, 2011

(65) Prior Publication Data

US 2012/0101930 A1 Apr. 26, 2012

Related U.S. Application Data

(60) Provisional application No. 61/455,456, filed on Oct. 21, 2010.

(51) Int. Cl.
*G06Q 40/00* (2012.01)
(52) U.S. Cl.
USPC .............................................. 705/35; 705/38
(58) Field of Classification Search
USPC ....................................................... 705/35–45
See application file for complete search history.

(56) References Cited

U.S. PATENT DOCUMENTS

| 5,819,226 | A | | 10/1998 | Gopinathan et al. | |
|---|---|---|---|---|---|
| 6,094,643 | A | * | 7/2000 | Anderson et al. | 705/44 |
| 6,714,918 | B2 | * | 3/2004 | Hillmer et al. | 705/18 |
| 7,386,105 | B2 | * | 6/2008 | Wasserblat et al. | 379/114.14 |
| 7,527,195 | B2 | * | 5/2009 | Keithley et al. | 235/380 |
| 7,578,438 | B2 | * | 8/2009 | Hogg et al. | 235/380 |
| 7,657,482 | B1 | * | 2/2010 | Shirey et al. | 705/38 |
| 7,657,497 | B2 | * | 2/2010 | Nandy | 706/45 |
| 7,668,769 | B2 | * | 2/2010 | Baker et al. | 705/35 |
| 7,707,089 | B1 | * | 4/2010 | Barton et al. | 705/35 |
| 7,840,520 | B2 | * | 11/2010 | Nandy | 706/47 |
| 8,032,438 | B1 | * | 10/2011 | Barton et al. | 705/35 |
| 8,036,981 | B2 | * | 10/2011 | Shirey et al. | 705/38 |
| 8,321,341 | B2 | * | 11/2012 | Nandy | 705/39 |
| 8,554,631 | B1 | * | 10/2013 | Barton et al. | 705/16 |
| 2002/0099649 | A1 | * | 7/2002 | Lee et al. | 705/38 |
| 2004/0064401 | A1 | * | 4/2004 | Palaghita et al. | 705/38 |
| 2004/0236696 | A1 | * | 11/2004 | Aoki et al. | 705/50 |

(Continued)

OTHER PUBLICATIONS

Fawcett, Tom; Provost, Foster, "Adaptive Fraud Detection", Data Mining and Knowledge Discovery 1.3 (1997), pp. 291-316.*

(Continued)

*Primary Examiner* — Mohammad Z Shaikh
(74) *Attorney, Agent, or Firm* — Kilpatrick Townsend Stockton LLP

(57) ABSTRACT

Systems and methods for risk and fraud mitigation are presented. According to one or more aspects of the disclosure, a plurality of transactions may be processed without applying one or more active fraud rules. A hit rate for at least one fraud rule of the one or more active fraud rules then may be determined. Thereafter, a positive hit rate for the at least one fraud rule may be determined based on fraud event data corresponding to the plurality of transactions. In some arrangements, each transaction of the plurality of transactions may be randomly selected, from a larger plurality of received transactions, for inclusion in the plurality of transactions to be processed without application of the one or more active fraud rules. Additionally or alternatively, in certain arrangements, one or more fraud rules may be activated or deactivated based on their corresponding hit rates and positive hit rates.

21 Claims, 10 Drawing Sheets

(56) References Cited

U.S. PATENT DOCUMENTS

| | | | |
|---|---|---|---|
| 2006/0041464 A1* | 2/2006 | Powers et al. .................... | 705/10 |
| 2006/0226216 A1* | 10/2006 | Keithley et al. ............... | 235/379 |
| 2006/0285665 A1* | 12/2006 | Wasserblat et al. ...... | 379/114.14 |
| 2007/0106582 A1 | 5/2007 | Baker et al. | |
| 2007/0119919 A1* | 5/2007 | Hogg et al. .................... | 235/380 |
| 2007/0198361 A1 | 8/2007 | Ronning et al. | |
| 2008/0109392 A1* | 5/2008 | Nandy ............................ | 706/47 |
| 2008/0208681 A1* | 8/2008 | Hammad et al. ................ | 705/13 |
| 2008/0270171 A1* | 10/2008 | Price et al. ......................... | 705/1 |
| 2009/0313129 A1* | 12/2009 | Rothschild ...................... | 705/17 |
| 2010/0094765 A1* | 4/2010 | Nandy .......................... | 705/317 |
| 2010/0138340 A1* | 6/2010 | Shirey et al. ..................... | 705/40 |
| 2010/0145836 A1* | 6/2010 | Baker et al. ..................... | 705/30 |
| 2010/0305993 A1* | 12/2010 | Fisher ................................ | 705/7 |
| 2011/0016052 A1* | 1/2011 | Scragg ............................. | 705/44 |
| 2011/0055078 A1* | 3/2011 | Nandy ............................. | 705/39 |
| 2011/0196791 A1* | 8/2011 | Dominguez .................... | 705/44 |
| 2013/0080368 A1* | 3/2013 | Nandy ............................. | 706/47 |

OTHER PUBLICATIONS

Pandey, Manoj, "A model for managing online fraud risk", The Journal of Operation Risk, vol. 5/No. 1, Spring 2010, pp. 49-63.*

"Retail Business Solutions Deploys SeeWhy for Real Time Fraud Service Offering", Wireless News, Nov. 24, 2007, pp. 1-2.*

International Search Report and Written Opinion for PCT Application No. PCT/US2011/057344, mailed on May 18, 2012, 9 pages.

* cited by examiner

Rule Table | Rule Editor

Admin Tools > Manage Fraud > Manage Rules / 500

Phases: [CHECKOUT ▽]    Payment Methods: [ALL ▽] / 505

| Select | Rule Name | Salience | Description | Action | Reason | Status | Active? / 510 |
|---|---|---|---|---|---|---|---|
| ☐ | Banned Country Check | 1000 | Buyer is from banned country. | DENY | Rule-8101 | Published | Yes |
| ☐ | NegativeLists-IpAddress | 1000 | Buyer is from banned IP address. | DENY | Rule-8102 | Published | Yes |
| ☐ | NegativeLists-User | 1000 | Buyer is banned. | DENY | Rule-8103 | Published | Yes |
| ☐ | NegativeLists-UserPaymentOption | 1000 | User payment option is not supported. | DENY | Rule-8130 | Published | Yes |
| ☐ | PBC-DeviceVelocityCheck-Amount | 1000 | PBC Dollar Spending exceeds daily limit 151 dollars. | DENY | Rule-8137 | Published | No |

FIG. 5

Reports > Refund, Chargeback, and Fraud > Fraud Report

Date Range: 2010-02-11 to: 2010-02-11 ← 705

View Report

| Site | Date | First Trip | Last Trip | User | IP Address | Country | Currency | Action Code |
|---|---|---|---|---|---|---|---|---|
| SILK | 02-11-2010 | 02-11-2010 12:00:22 | 02-11-2010 12:00:22 | XXXX | XXXX | US | USD | VERIFY |
| IMVUG | 02-11-2010 | 02-11-2010 12:01:14 | 02-11-2010 12:01:14 | XXXX | XXXX | US | XPTPS | FLAGGED |
| IMVUG | 02-11-2010 | 02-11-2010 12:03:42 | 02-11-2010 12:03:42 | XXXX | XXXX | US | XPTPS | FLAGGED |
| EVE | 02-11-2010 | 02-11-2010 12:03:42 | 02-11-2010 12:03:42 | XXXX | XXXX | US | XPTPS | FLAGGED |
| EVE | 02-11-2010 | 02-11-2010 12:06:10 | 02-11-2010 12:06:10 | XXXX | XXXX | US | USD | REVIEW |
| UGC | 02-11-2010 | 02-11-2010 12:06:10 | 02-11-2010 12:06:10 | XXXX | XXXX | US | USD | REVIEW |
| WR | 02-11-2010 | 02-11-2010 12:14:31 | 02-11-2010 12:14:31 | XXXX | XXXX | US | USD | VERIFY |
| WR | 02-11-2010 | 02-11-2010 12:18:46 | 02-11-2010 12:18:46 | XXXX | XXXX | US | XPTPS | FLAGGED |
| CROS | 02-11-2010 | 02-11-2010 12:25:26 | 02-11-2010 12:25:26 | XXXX | XXXX | IT | USD | DENY |
| | 02-11-2010 | 02-11-2010 12:27:38 | 02-11-2010 12:27:38 | XXXX | XXXX | CA | USD | REVIEW |

SOFTWARE AND METHODS FOR RISK AND FRAUD MITIGATION

CROSS-REFERENCES TO RELATED APPLICATIONS

The present non-provisional application claims the benefit of U.S. Provisional Patent Application No. 61/455,456, filed on Oct. 21, 2010, and entitled "Software and Methods for Risk and Fraud Mitigation for Transaction Processing Systems Utilizing Segmented Distribution and Randomization of Rule Sets," which is incorporated by reference herein in its entirety for all purposes.

BACKGROUND

Detecting and preventing fraudulent transactions is a concern for many organizations that process payments. Indeed, such organizations may apply various rules when processing transactions that operate to deny transactions that seem fraudulent, while allowing other transactions that seem legitimate to be completed. In implementing these rules, however, the payment processor's interest in denying transactions that seem fraudulent may need to be balanced with a competing interest in providing users with a convenient experience, because rules that deny too many legitimate transactions along with the fraudulent ones may lead to a negative user experience. On the other hand, implementing rules that are too lax may expose the payment processor to heightened fraud and consequent financial losses.

A table showing these competing interests is illustrated in FIG. 1A. As seen in this table, it may be desirable for fraud rules to allow legitimate transactions and block fraudulent transactions. However, blocking legitimate transactions (e.g., with fraud rules that are inaccurate) may be considered one type of error in processing transactions, and allowing fraudulent transactions (e.g., with fraud rules that are ineffective) may be considered another type of error in processing transactions. Aspects of the disclosure provide more convenient and effective ways of mitigating risk and fraud in processing transactions.

Embodiments of the invention address these problems, individually and collectively.

SUMMARY

Aspects of the disclosure are generally directed to systems and methods for risk and fraud mitigation. Some aspects of the disclosure relate to selecting a subset of transactions (e.g., a subset of all transactions received by an organization that processes payments) for inclusion in a control group. In these aspects, a plurality of transactions (e.g., which together form the control group) may be processed without applying one or more active fraud rules. Subsequently, a hit rate for at least one fraud rule may be determined, and the hit rate may represent a first set of transactions within the control group that would have been declined by operation of the at least one fraud rule had the rule been applied during processing. In addition, a positive hit rate for the at least one fraud rule may be determined, and the positive hit rate may represent a second set of transactions within the first set that actually resulted in at least one fraud event (e.g., a chargeback). In at least one arrangement, transactions are randomly selected for inclusion in the control group from a larger set of transactions received by the organization.

Other aspects of the disclosure relate to optimizing the fraud rules that are applied to transactions during processing based on the hit rate and the positive hit rate corresponding to the fraud rules. For example, an inactive fraud rule may be activated when it is determined that the ratio of the rule's positive hit rate to the rule's hit rate exceeds a predetermined threshold. Additionally or alternatively, an active fraud rule may be deactivated when it is determined that the ratio of the rule's positive hit rate to the rule's hit rate falls below a predetermined threshold.

These and other embodiments of the invention are described in further detail below.

BRIEF DESCRIPTION OF THE DRAWINGS

FIG. 5 is a diagram that illustrates an example user interface screen for managing one or more fraud rules according to one or more aspects of the disclosure.

FIG. 7A is a diagram that illustrates an example user interface screen for viewing a fraud report according to one or more aspects of the disclosure.

DETAILED DESCRIPTION

Figures 1A, 1B:
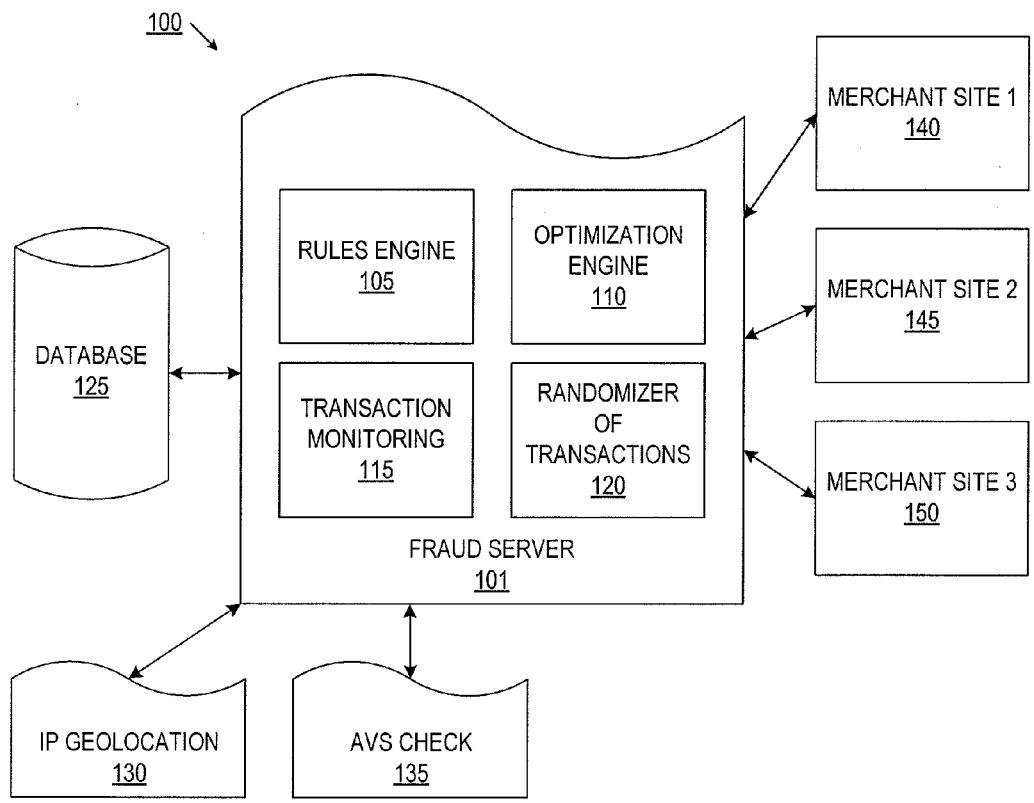
FIG. 1A is a table that illustrates an example of one or more processing errors that one or more aspects of the disclosure may address.
FIG. 1B is a simplified block diagram that illustrates an example of a system for risk and fraud mitigation according to one or more aspects of the disclosure.

Aspects of the disclosure are generally directed to systems and methods for risk and fraud mitigation. In particular, one or more aspects of the disclosure may be implemented in a transaction processing system, such as a system used by a credit or debit payment processing network, to gain a better understanding of the identifying characteristics of fraudulent transactions and to fine-tune the rules used in deciding which transactions are authorized and which are declined.

According to one or more aspects of the disclosure, these objects may be accomplished by treating a subset of all transactions as a control group that are processed and authorized without regard to the fraud rules that are otherwise in effect. By analyzing information about the transactions in the control group, such as how many of the control group transactions later resulted in an actual fraud event like a chargeback, and by modeling how the fraud rules would have applied to these control group transactions, the effectiveness and accuracy of how well individual fraud rules actually predict fraudulent transactions may be determined. Moreover, the results of this analysis may be used to decide which fraud rules should be used in deciding whether to authorize or decline transactions, and which should not.

Prior to discussing various embodiments and arrangements in greater detail, several terms will be described to provide a better understanding of this disclosure.

A "transaction" may be an interaction between two parties, at least one of which may provide value (e.g., money) in exchange for something else. A transaction may include a request (e.g., an authorization request message) to authorize or decline an exchange of funds between two entities. In many instances, such a request may be received by a computing device, such as a computer server operated by a payment processing network. The two entities who wish to exchange funds may, for example, include a payee, who is to receive the funds, and a payor, who is to pay the funds. The payor and the payee may, for instance, hold accounts with different financial institutions (e.g., different banks), and the payment processing network may connect these different financial institutions to allow them to communicate information that enables the exchange of funds between the payor and the payee. For simplicity and ease of illustration, the description below may refer to the submission of a "transaction" or the like. In this case, the submission of a transaction may refer to submission of requests or messages that form part of the transaction.

In many instances, the payee may be a merchant, and the transaction may represent a payment to the merchant for goods and/or services provided by the merchant to the payor, for instance. Additionally, the payor may be a person, organization, or other entity to which a financial institution has issued one or more payment devices, such as one or more credit cards, debit cards, gift cards, payment chips or tags (e.g., devices configured to wirelessly exchange radio-frequency data, such as tags implementing Near-Field Communications technology), and/or other payment devices. To initiate the transaction, the payor may have presented such a payment device to the merchant to pay for the goods and/or services provided by the merchant, for instance.

A "fraudulent transaction" may be a transaction that is initiated by or on behalf of an individual, organization, or other entity that is not itself initiating the transaction and has not authorized another entity to initiate the transaction on its behalf. For example, a fraudulent transaction may result when a fraudster obtains a legitimate accountholder's credit card number and uses the credit card number to purchase merchandise over the Internet.

A "fraud rule" may be a rule used by a payment processing network to identify fraudulent transactions. In many instances, such a rule may be defined as one or more conditions that, if met with respect to a particular transaction, indicate that the transaction is fraudulent or otherwise not authorized by the authentic parties to the transaction. Each of the one or more conditions may probe different aspects of the transaction so as to assess the likelihood of the transaction being fraudulent or legitimate, and the transaction may be authorized or declined (e.g., by the payment processing network) based on the fraudulent-or-legitimate outcome of applying the rule. Many factors may be considered and accounted for in making this determination. For instance, one example fraud rule may include a condition that asks whether a transaction originates from a particular country (and accordingly causes transaction originating from that country to be declined), while another example fraud rule may include a condition that asks whether the transaction exceeds a daily spending limit for the account.

An "active fraud rule" may be a fraud rule that is applied to one or more transactions when determining, for instance, whether to authorize or decline the one or more transactions. In addition, if application of an active fraud rule to a particular transaction indicates that the transaction may be fraudulent (e.g., because the conditions of the fraud rule are met), then the transaction may be declined.

An "inactive fraud rule" may be a fraud rule that is also applied to one or more transactions when determining whether to authorize or decline the one or more transactions. In contrast to an active fraud rule, however, if application of an inactive fraud rule to a particular transaction indicates that the transaction may be fraudulent (e.g., because the conditions of the fraud rule are met), then the transaction might not be declined. Thus, in many instances, an inactive fraud rule may be a newly introduced fraud rule that is still being tested (e.g., to evaluate how effectively the rule may or might not identify fraudulent transactions). Additionally or alternatively, an inactive fraud rule may be a fraud rule that has been deactivated because it was determined that the rule was not accurate and/or effective enough at identifying fraudulent transactions.

A "hit rate" may be a value or number that measures or counts, for a particular fraud rule, how many transactions meet the one or more conditions of the fraud rule. Thus, for an active fraud rule, the hit rate may measure not only how many transactions meet all of the conditions of the fraud rule, but also how many transactions are declined as a result of the fraud rule.

A "fraud event" may be an event that occurs in connection with a particular transaction that allows the transaction to be objectively identified as fraudulent. Such an event may typically occur well after the transaction is initially processed and authorized (e.g., by a payment processing network). In many instances, a fraud event may be a chargeback, which is when a previously authorized transaction must be reversed (and the corresponding funds that were exchanged must be returned) because the accountholder identified the transaction as a fraudulent one that was not actually initiated by the accountholder.

A "positive hit rate" may be a value or number that measures or counts, for a particular fraud rule, how many transactions not only met the one or more conditions of the fraud rule, but also subsequently resulted in a fraud event. The positive hit rate may be expressed as a percentage. The positive hit rate may be measured with respect to inactive fraud rules and with respect to active fraud rules when such active fraud rules are not applied to a subset of transactions (e.g., a control group of transactions), since if an active fraud rule were applied to a transaction that met the conditions of the fraud rule, the transaction would be declined. Moreover, by comparing the positive hit rate for a fraud rule to the rule's hit rate, as described in greater detail below, one can develop an understanding of how accurately and effectively the particular fraud rule identifies fraudulent transactions, and one can decide whether to activate or deactivate the fraud rule accordingly.

FIG. 1B is a simplified block diagram that illustrates an example of a system for risk and fraud mitigation according to one or more aspects of the disclosure. In one or more arrangements, system 100 may include a fraud server computer 101. Fraud server computer 101 may be a computing device that includes one or more processors, storage devices, and/or other hardware components and/or software modules. These components and/or modules may allow fraud server computer 101 to implement various aspects of the disclosure, such as one or more of the methods and/or method steps described in greater detail below. For example, fraud server computer 101 may be operated by a payment processing network to process transactions, select some transactions for inclusion in a control group, and/or optimize the fraud rules that are applied to transactions during processing.

To perform these and/or other functions, fraud server computer 101 may include, in at least one arrangement, a rules engine 105, an optimization engine 110, a transaction monitoring unit 115, and a randomizer 120. In some arrangements, rules engine 105, optimization engine 110, transaction monitoring unit 115, and randomizer 120 may be implemented as software modules stored as computer-readable instructions on a computer-readable medium that, when executed by a computing device, cause the computing device to provide the software modules and the functionalities (described below) associated with each of them. In other arrangements, rules engine 105, optimization engine 110, transaction monitoring unit 115, and randomizer 120 may implemented in separate computing devices that are communicatively coupled (e.g., via a back-office network) and operate together to provide the functionalities of fraud server computer 101. These and other features of fraud server computer 101 will now be described through a discussion of example functionalities that such components and/or modules may provide.

In one or more arrangements, fraud server computer 101 may receive transactions from a plurality of merchant sites, such as merchant site 140, merchant site 145, and merchant site 150, which each may transmit transactions to fraud server computer 101 to authorize, decline, and/or otherwise process the transactions. In one example, one merchant site (e.g., merchant site 140) may be an online retailer, another merchant site (e.g., merchant site 145) may be a grocery store, and another merchant site (e.g., merchant site 150) may be a public transit authority. While three merchant sites are illustrated in this example for simplicity, fraud server computer 101 may, in practice, receive transactions from thousands of, if not hundreds of thousands of, different merchants.

When a transaction is first transmitted to fraud server computer 101 from a merchant site (e.g., merchant site 140), electronic information about the transaction may first be received by transaction monitoring unit 115 of fraud server computer 101. For example, transaction monitoring unit 115 may establish and/or maintain a data connection with a payment terminal (e.g., a credit card reader, cash register, etc.) located at the merchant site, and transaction monitoring unit 115 subsequently may receive information about the transaction via this data connection.

Subsequently, the transaction monitoring unit 115 may send information about the received transaction to randomizer 120. In one or more arrangements, randomizer 120 may randomly select transactions received by the fraud server computer 101 for inclusion in a control group. In at least one arrangement, when a transaction is selected for inclusion in the control group, the fraud server computer 101 may simply authorize the transaction, even if one or more active fraud rules indicate that the transaction may be fraudulent (e.g., even if the conditions of one or more fraud rules are met by the transaction). By randomly selecting some transactions for inclusion in a control group with respect to which fraud rules are not applied, a baseline amount of fraud may be determined by measuring how many of the control group transactions subsequently result in fraud events, such as chargebacks. Additionally or alternatively, the accuracy and effectiveness of fraud rules may be determined using the control group data as an input, as one may determine how many transactions a particular rule would have declined (e.g., a hit rate for the rule) and how many of those transactions were actually fraudulent transactions (e.g., a positive hit rate for the rule).

In some arrangements, prior to selecting a transaction for inclusion in the control group, randomizer 120 may first exclude transactions having known fraudulent elements from the group of transactions from which it is selecting, such that transactions having known fraudulent elements may be prevented from being selected for inclusion in the control group. Known fraudulent elements may include, for instance, user names and/or other user identifiers known to be associated with fraudsters and/or other fraudulent transactions, Internet addresses (e.g., IP addresses, URLs, domain names, etc.) known to be associated with fraudsters and/or other fraudulent transactions, and/or account numbers (e.g., credit card numbers, debit card numbers, gift card numbers, etc.) known to be associated with fraudsters and/or other fraudulent transactions. In at least one arrangement, information about known fraudulent elements may be included in one or more negative lists and/or negative files, which in turn may be stored in a data table or database that is stored on and/or accessible to fraud server computer 101, such as database 125. Moreover, in some cases, it may be desirable to exclude transactions having known fraudulent elements in this manner so as to prevent known fraudsters from taking advantage of instances where a transaction is selected for inclusion in the control group and fraud rules that would otherwise prevent the fraudster from completing a fraudulent transaction are not applied.

In one or more arrangements, rules engine 105 then may apply one or more fraud rules to the transaction. If, for instance, the transaction was not selected for inclusion in the control group, then rules engine 105 may apply any and/or all of the fraud rules that are currently active fraud rules and in turn may determine, based on whether the transaction meets the conditions of any of the active fraud rules, whether to authorize or decline the transaction. In addition, the rules engine 105 may evaluate the transaction using any and/or all of the inactive fraud rules to collect data as to whether such inactive fraud rules would have identified the transaction as fraudulent (e.g., without allowing such inactive fraud rules to affect the decision on whether to authorize or decline the transaction, however). On the other hand, if the transaction was selected for inclusion in the control group, then rules engine 105 may, for instance, allow the transaction to be authorized without applying any of the active fraud rules. In addition, the rules engine 105 may evaluate the transaction using any and/or all of the active and inactive fraud rules to collect data as to whether such active and inactive fraud rules would have identified the transaction as fraudulent (e.g., without allowing any of the fraud rules to affect the decision to authorize the transaction).

One example of a fraud rule that might be applied by rules engine 105 may operate such that if a particular user or accountholder has had a transaction declined (e.g., within a predetermined period of time, such as within the last twenty four hours), then any subsequent transaction attempted during a second period of time (e.g., the next three days) may be declined. For instance, if a user attempted a first transaction that fraud server computer 101 declined because it was determined that the first transaction was attempted more than 1,000 miles away from the user's registered billing address (in violation of a particular fraud rule, for instance), then any subsequent transactions attempted by the user during the next three days (following the time at which the first transaction was attempted and declined) will in turn be declined as well. Thus, in this example, even if the user were to attempt a second transaction within 50 miles of the user's registered billing address on the following day, this second transaction would be declined by operation of this example fraud rule. As may be seen in this example, by implementing such a fraud rule, the risk of allowing further fraudulent transactions may be mitigated by preventing subsequent attempted transactions from being authorized for a particular period of time (during which, for instance, the account may be investigated and/or other actions may be taken).

In some instances, when evaluating a transaction using one or more fraud rules, rules engine 105 may draw on information provided by external and/or third party services. For example, some fraud rules may be tied to the current location of the payor. In situations where the payor is purchasing goods online, rules engine 105 might rely on an external IP geolocation service 130 to determine the current location of the payor (e.g., based on the IP address from which the order originated) so as to evaluate the transaction using such fraud rules. In another example, some fraud rules may be tied to the registered billing address for a payment device being used to initiate the transaction (e.g., the registered billing address of a credit card). In these cases, rules engine 105 might rely on an external address verification service (AVS) checking service 135 to compare a provided billing address for the payment device (e.g., as entered by the user originating the transaction) with the registered billing address for the payment device. Other possible inputs for fraud rules that may be provided by and/or analyzed by external and/or third party services may include IP proxy addresses, device identification fingerprints, transaction velocity counts, transaction value velocity amounts, browser languages, browser types, and/or operating system details.

In one or more arrangements, optimization engine 110 may determine whether to activate, deactivate, and/or otherwise adjust fraud rules. For example, optimization engine 110 may determine that an inactive fraud rule should be activated based on, for instance, a determination that the ratio of the fraud rule's positive hit rate to the fraud rule's hit rate exceeds a predetermined threshold amount. For instance, an inactive fraud rule may have a positive hit rate of 8 transactions and a hit rate of 10 transactions, and optimization engine 110 may determine to activate the fraud rule based on the ratio of 8/10 or 0.8 exceeding a predetermined threshold amount of 0.75, as when this ratio exceeds the predetermined threshold, the fraud rule may be performing accurately and effectively enough as to warrant activation. On the other hand, in another example, optimization engine 110 may determine that an active fraud rule should be deactivated based on, for instance, a determination that the ratio of the fraud rule's positive hit rate to the fraud rule's hit rate falls below a predetermined threshold amount. For instance, an active fraud rule may have a positive hit rate of 6 transactions and a hit rate of 24 transactions, and optimization engine 110 may determine to deactivate the fraud rule based on the ratio of 6/24 or 0.25 falling below a predetermined threshold amount of 0.30, as when this ratio falls below the predetermined threshold, the fraud rule may be performing so inaccurately and ineffectively as to warrant deactivation.

Additionally or alternatively, as seen in these examples, the threshold that an inactive fraud rule must exceed to warrant activation may be different from and/or greater than the threshold that an active fraud rule must fall below to warrant deactivation. Additionally or alternatively, the activation threshold and/or deactivation threshold may vary from rule-to-rule, such that one rule may have a first activation threshold and a first deactivation threshold, while a another rule may have a second activation threshold and a second deactivation threshold, different from the first activation threshold and the first deactivation threshold, respectively.

Figure 2:
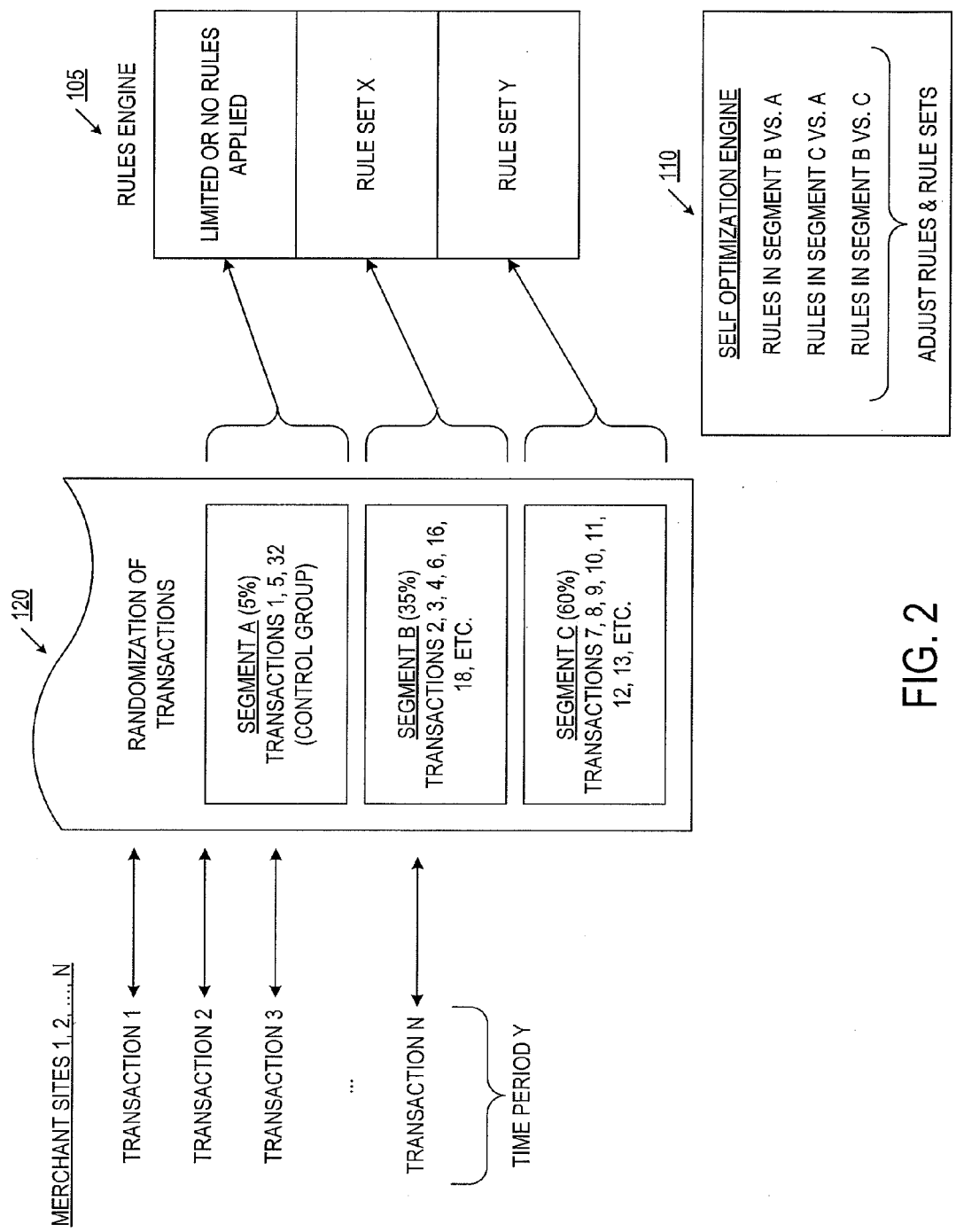
FIG. 2 is a simplified block diagram that illustrates additional example aspects of a system for risk and fraud mitigation according to one or more aspects of the disclosure.

Turning now to FIG. 2, an example of how different sets of fraud rules may be applied to different transactions, such as transactions received by fraud server computer 101, will be described. In particular, FIG. 2 is a simplified block diagram that illustrates additional example aspects of a system for risk and fraud mitigation according to one or more aspects of the disclosure.

As seen in FIG. 2, fraud server computer 101 may receive a plurality of transactions (e.g., "Transaction 1," "Transaction 2," "Transaction 3," etc.) during a particular time period (e.g., "Time Period Y"). As these transactions are received, randomizer 120 may randomly select one or more transactions for inclusion in a control group (e.g., "Segment A") with respect to which only limited fraud rules or no fraud rules might be applied in determining whether to authorize or decline the transactions. In addition, randomizer 120 may sort other transactions into various segments (e.g., "Segment B" and "Segment C") based on various criteria. For example, randomizer 120 may sort transactions that originate within the U.S. into Segment B and transactions that originate outside of the U.S. into Segment C, and different sets of fraud rules may be applied to transactions in the different segments. For instance, rules engine 105 may apply a first set of rules (e.g., "Rule Set X") to transactions in a first segment (e.g., "Segment B") and a second set of rules (e.g., "Rule Set Y"), which may different from the first set of rules, to transactions in a second segment (e.g., "Segment C"). While transactions that originate within the U.S. and transactions that originate outside of the U.S. are used as examples of different segments here, other distinctions may be drawn and other segments may be defined instead of or in addition to those discussed in these examples.

In at least one arrangement, where transactions are sorted into different segments, randomizer 120 may select transactions corresponding to each segment in proportion to the relative size of each segment. For example, if transactions corresponding to a first segment make up 40% of all transactions and transactions corresponding to a second segment make up the other 60% of all transactions, then randomizer 120 may randomly select transactions for inclusion in the control group such that 40% of transactions in the control group correspond to the first segment and 60% of the transactions in the control group correspond to the second segment. This approach may be desirable in some instances because by maintaining the proportions of the various transaction segments within the control group, the control group may better reflect the actual nature of all transactions received and processed by the fraud server computer 101.

In addition, during and/or after the particular time period (e.g., "Time Period Y") in which transactions are received, optimization engine 110 may adjust one or more fraud rules and one or more rule sets to more accurately and effectively identify fraudulent transactions. For example, optimization engine 110 may activate one or more inactive fraud rules and/or deactivate one or more active fraud rules. In this manner, fraud rules might be inferred from one set of transactions and subsequently applied when processing a different set of transactions. Additionally or alternatively, optimization engine 110 may compare different sets of fraud rules to determine whether one set of fraud rules is more accurate and effective at identifying fraudulent transactions than another (e.g., "Rules in Segment B vs. C"). In some instances, a single consolidated rule may be defined as a combination of a plurality of other fraud rules, and the effectiveness and/or accuracy of the single consolidated rule may be evaluated in the same way that the effectiveness and/or accuracy of any other fraud rule may be evaluated as described herein. By defining one or more combinations of rules and then evaluating the combinations (e.g., by determining the hit rate and positive hit rate for the combination and then automatically activating and/or deactivating the rule, for instance, by using one or more of the methods described below), the resources (e.g., computer processing resources, such as processing power, processing time, etc.) required to conduct the rule optimization analysis may be reduced because a plurality of rules may be evaluated as if they were one.

Having described various aspects, features, and functionalities of a system for risk and fraud mitigation with respect to FIGS. 1B and 2, the methods and/or method steps that may implemented by and/or in such a system will now be described in greater detail with reference to FIGS. 3, 4A, and 4B.

Figure 3:
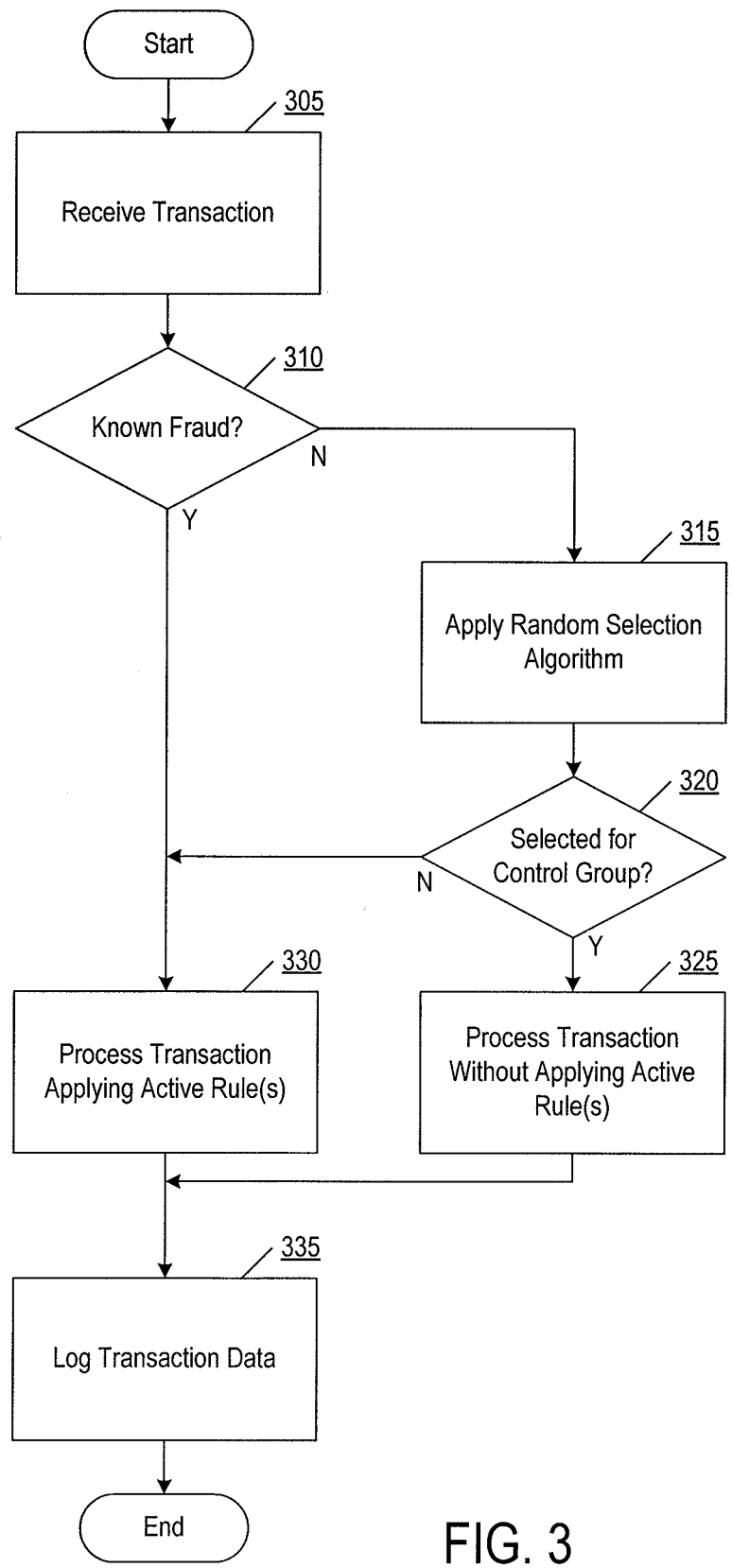
FIG. 3 is a simplified flow diagram that illustrates a method of selecting transactions for inclusion in a control group according to one or more aspects of the disclosure.

FIG. 3 is a simplified flow diagram that illustrates a method of selecting transactions for inclusion in a control group according to one or more aspects of the disclosure. In one or more arrangements, the example method illustrated in FIG. 3 may be performed by a computing device, such as fraud server computer 101, in selecting one or more transactions for inclusion in a control group, for instance.

In step 305, a transaction may be received. For example, in step 305, fraud server computer 101 may receive a transaction from a merchant site. As described above, the transaction may, for instance, be received via a payment processing network, and the transaction may represent a request to authorize or decline an exchange of funds between the merchant and a payor who presented a payment device (e.g., a credit card) to the merchant to pay for goods and/or services provided by the merchant.

In step 310, it may be determined whether the transaction is associated with one or more known fraudulent elements. For example, in step 310, fraud server computer 101 may determine whether the payor originating the transaction has a user name or other user identifier known to be associated with a fraudster and/or other fraudulent transactions, whether the transaction is originating from an Internet address (e.g., an IP address, URL, domain name, etc.) known to be associated with a fraudster and/or other fraudulent transactions, and/or whether the transaction involves an account number (e.g., a bank account number, a checking account number, a savings account number, etc.) known to be associated with a fraudster and/or other fraudulent transactions. Other possible known fraudulent elements that may be similarly evaluated include whether the transaction involves a known fraudulent card number (e.g., a credit card number, debit card number, gift card number, etc.), whether the transaction is associated with a known fraudulent phone number, whether the transaction involves a known fraudulent billing address, and/or whether the transaction involves a known fraudulent device fingerprint (e.g., a unique identifier assigned to and/or otherwise associated with a particular payment device).

In one or more additional and/or alternative arrangements, fraud server computer 101 may determine that a transaction is associated with a known fraudulent element if the payor originating the transaction is associated with any other transaction that has tripped a fraud rule within a predetermined period of time. For example, if the payor originating the transaction also attempted another transaction within a predetermined period of time (e.g., within the last twenty four hours, within the last three days, within the last seven days, etc.) that was declined by operation of one or more active fraud rules (e.g., by applying a fraud rule to the transaction, it was determined that the transaction may be fraudulent, because, e.g., the transaction met one or more criteria of the fraud rule), then a system implementing one or more aspects of the disclosure (e.g., fraud server computer 101) may determine that the transaction is associated with a known fraudulent element. In operation, such a determination may be significant, because determining that the transaction is associated with a known fraudulent element (e.g., determining that the payor originated another transaction that tripped a fraud rule and/or was declined as a result of applying the fraud rule within a recent time period) may in turn result in the transaction being prevented from being selected for inclusion in a control group of transactions that are processed without applying one or more fraud rules, as described below.

Referring again to FIG. 3, if it is determined in step 310, that the transaction is not associated with one or more known fraudulent elements, then in step 315, a random selection algorithm may be applied to the transaction to determine whether to select the transaction for inclusion in a control group. For example, in step 315, fraud server computer 101 may execute a random selection algorithm to determine whether to select the transaction for inclusion in a control group. In at least one arrangement, this may involve fraud server computer 101 assigning a first random number within a predetermined range (e.g., an integer between 1 and 100) to the transaction, generating a second random number within a predetermined range (e.g., another integer between 1 and 100), then determining that the transaction is selected for the control group if the first random number matches the second random number, and determining that the transaction is not selected for the control group if the first random number does not match the second random number.

In step 320, it may be determined whether the transaction was selected for inclusion in the control group. For example, in step 320, fraud server computer 101 may determine whether application of the random selection algorithm in step 315 resulted in the transaction being selected for inclusion in the control group.

If it is determined, in step 320, that the transaction was selected for inclusion in the control group, then in step 325, the transaction may be processed without applying one or more active fraud rules. For example, if fraud server computer 101 determines that the transaction was selected for inclusion in the control group, then fraud server computer 101 may determine to authorize the transaction, even if one or more active fraud rules indicate that the transaction may be fraudulent (e.g., because the transaction meets the conditions of one or more active fraud rules). In addition, having determined to authorize the transaction, fraud server computer 101 may, in processing the transaction for instance, send a message to the merchant site indicating that the transaction has been authorized.

On the other hand, if it is determined, in step 320, that the transaction was not selected for inclusion in the control group, or if it is determined, in step 310, that the transaction is associated with one or more known fraudulent elements, then in step 330, the transaction may be processed and one or more active fraud rules may be applied during the processing. In instances where the transaction is associated with one or more fraudulent elements, this processing may typically result in the transaction being declined. For example, if fraud server computer 101 determines that the transaction was not selected for inclusion in the control group (or if fraud server computer 101 determines that the transaction is associated with one or more known fraudulent elements), then fraud server computer 101 may process the transaction by applying one or more active fraud rules to the transaction and determining, based on whether any of the active fraud rules indicate the transaction as being fraudulent, whether to authorize or decline the transaction. In addition, once the active fraud rules have been applied and a decision to authorize or decline the transaction has been made, fraud server computer 101 may, in processing the transaction for instance, send a message to the merchant site indicating whether the transaction has been authorized or declined.

Subsequently, in step 335, transaction data may be logged. For example, in step 335, fraud server computer 101 may log data about the transaction by storing such data in a data table or database (e.g., database 125). In one or more arrangements, fraud server computer 101 may, in logging transaction data, store information including an identifier corresponding to the transaction, an amount of the transaction, the time and date the transaction was processed, an indication of whether the transaction was authorized or declined, an indication of whether the transaction was selected for inclusion in the control group, and/or other information about the transaction. By logging transaction data in this manner, fraud event data may subsequently be analyzed in light of the transaction data to optimize fraud rules, as described in greater detail below with respect to FIG. 4A.

Figure 4A:
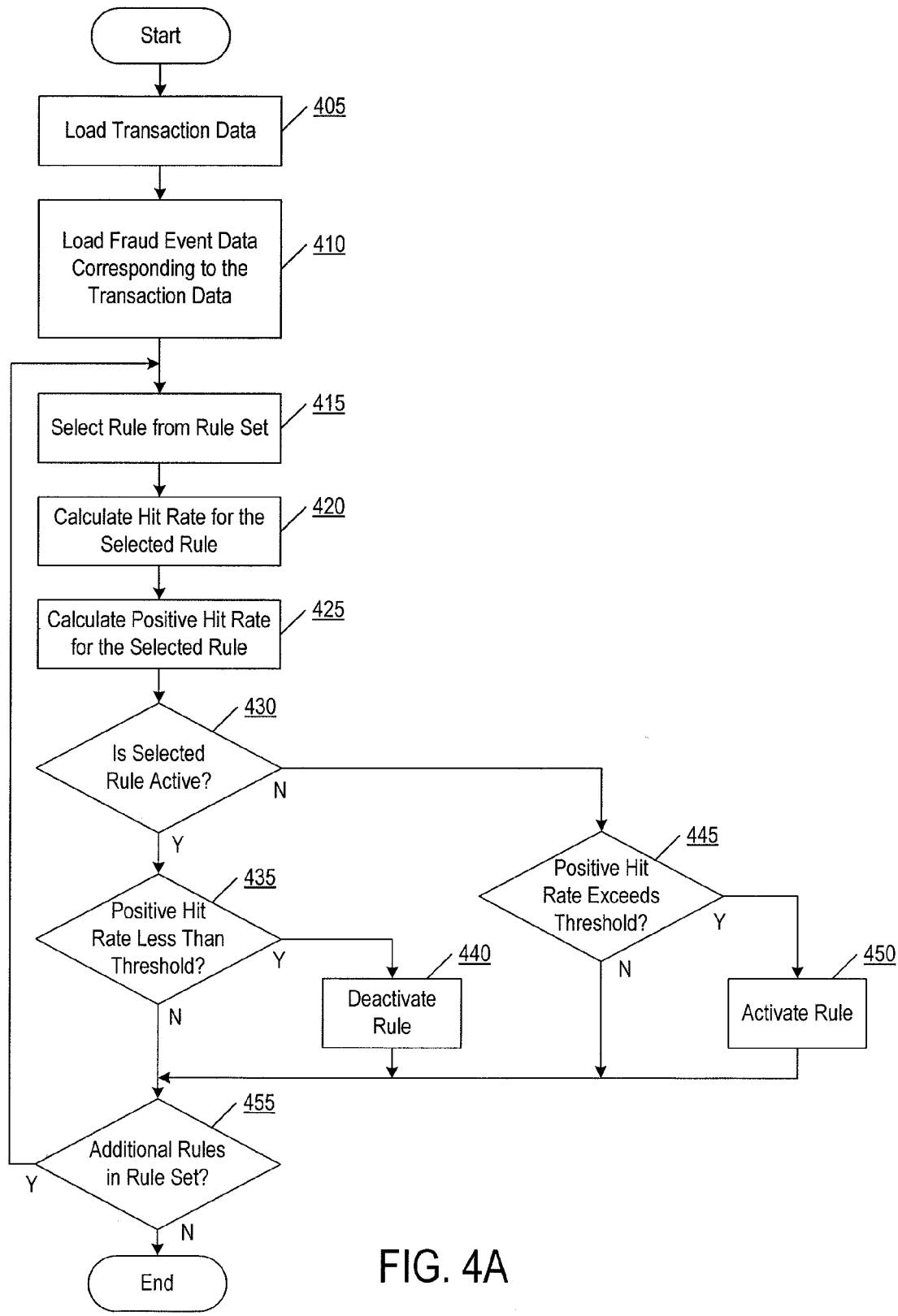
FIG. 4A is a simplified flow diagram that illustrates a method of optimizing fraud rules according to one or more aspects of the disclosure.

FIG. 4A is a simplified flow diagram that illustrates a method of optimizing fraud rules according to one or more aspects of the disclosure. In one or more arrangements, the example method of FIG. 4A may be performed by a computing device, such as fraud server computer 101, in optimizing fraud rules applied to transactions, for instance.

In step 405, transaction data may be loaded. For example, in step 405, fraud server computer 101 may load transaction data, such as the transaction data logged during one or more prior iterations of the method of FIG. 3. Such transaction data may include various information about a plurality of transactions previously processed by fraud server computer 101, for instance, such as an identifier for each transaction, an amount for each transaction, a time and date each transaction was processed, an indication of whether each transaction was authorized or declined, an indication of whether each transaction was selected for inclusion in a control group, and so on.

In step 410, fraud event data corresponding to the transaction data may be loaded. For example, in step 410, fraud server computer 101 may load information (e.g., from database 225) about one or more fraud events that occurred in connection with one or more transactions described in the transaction data that was loaded. Such fraud event data may indicate, for instance, whether or not a fraud event (e.g., a chargeback) occurred in connection with each transaction for which transaction data is available.

In step 415, a fraud rule from a rule set (e.g., a particular rule set to be evaluated) may be selected. For example, in step 415, fraud server computer 101 may select a fraud rule to be analyzed, and in instances where the analysis is repeated in a loop for all of the fraud rules in a particular rule set, the fraud server computer 101 may select the first rule in the rule set in the first iteration of the loop and, in subsequent iterations of the loop, may select the next sequential rule in the rule set.

In step 420, a hit rate may be calculated for the selected fraud rule. For example, in step 420, fraud server computer 101 may calculate a hit rate for the selected fraud rule by determining, based on the previously loaded transaction data, the number transactions in the control group that the fraud rule would have indicated as being fraudulent (e.g., the number of transactions in the control group that meet all the conditions of the selected fraud rule and thus would have been declined had the selected fraud rule been applied).

In step 425, a positive hit rate may be calculated for the selected fraud rule. For example, in step 425, fraud server computer 101 may calculate a positive hit rate for the selected fraud rule by determining, based on the previously loaded transaction data and the previously loaded fraud event data, the number of transactions in the control group that the fraud rule would have indicated as being fraudulent and which resulted in a fraud event, such as a chargeback.

In step 430, it may be determined whether the selected fraud rule is active. If the selected fraud rule is active, then in step 435, fraud server computer 101 may, for example, determine whether the positive hit rate for the selected fraud rule is less than a predetermined threshold. In some arrangements, fraud server computer 101 may alternatively evaluate the ratio of the positive hit rate to the hit rate for the selected fraud rule, and accordingly may determine whether this ratio is less than a predetermined threshold. If, in step 435, fraud server computer 101 determines that the positive hit rate (or the ratio) is less than a predetermined threshold, then in step 440, fraud server computer 101 may, for instance, deactivate the selected fraud rule. In doing so, fraud server computer 101 may optimize active fraud rules by deactivating a fraud rule that inaccurately and/or ineffectively identifies fraudulent transactions (e.g., as based on the relationship between the fraud rule's hit rate and positive hit rate).

On the other hand, if the selected fraud rule is inactive, then in step 445, fraud server computer 101 may, for example, determine whether the positive hit rate for the selected fraud rule exceeds a predetermined threshold. As in the case above, fraud server computer 101 may, in some arrangements, alternatively evaluate the ratio of the positive hit rate to the hit rate for the selected fraud rule, and accordingly may determine whether this ratio exceeds a predetermined threshold. If, in step 445, fraud server computer 101 determines that the positive hit rate (or the ratio) exceeds a predetermined threshold, then in step 450, fraud server computer 101 may, for instance, activate the selected fraud rule. In doing so, fraud server computer 101 may optimize active fraud rules by activating an inactive fraud rule that accurately and/or effectively identifies fraudulent transactions (e.g., as based on the relationship between the fraud rule's hit rate and positive hit rate).

Subsequently, in step 455, it may be determined whether there are additional fraud rules in the rule set to be analyzed and/or optimized (e.g., by repeating the steps above with respect to another fraud rule in the rule set). If, for example, fraud server computer 101 determines that there is at least one additional rule in the rule set to be analyzed and/or optimized, then fraud server computer 101 may return to executing step 415 and may select the next rule in the rule set to be analyzed and/or optimized. On the other hand, if there are no additional fraud rules in the rule set to be analyzed and/or optimized, then the method may end.

Figure 4B:
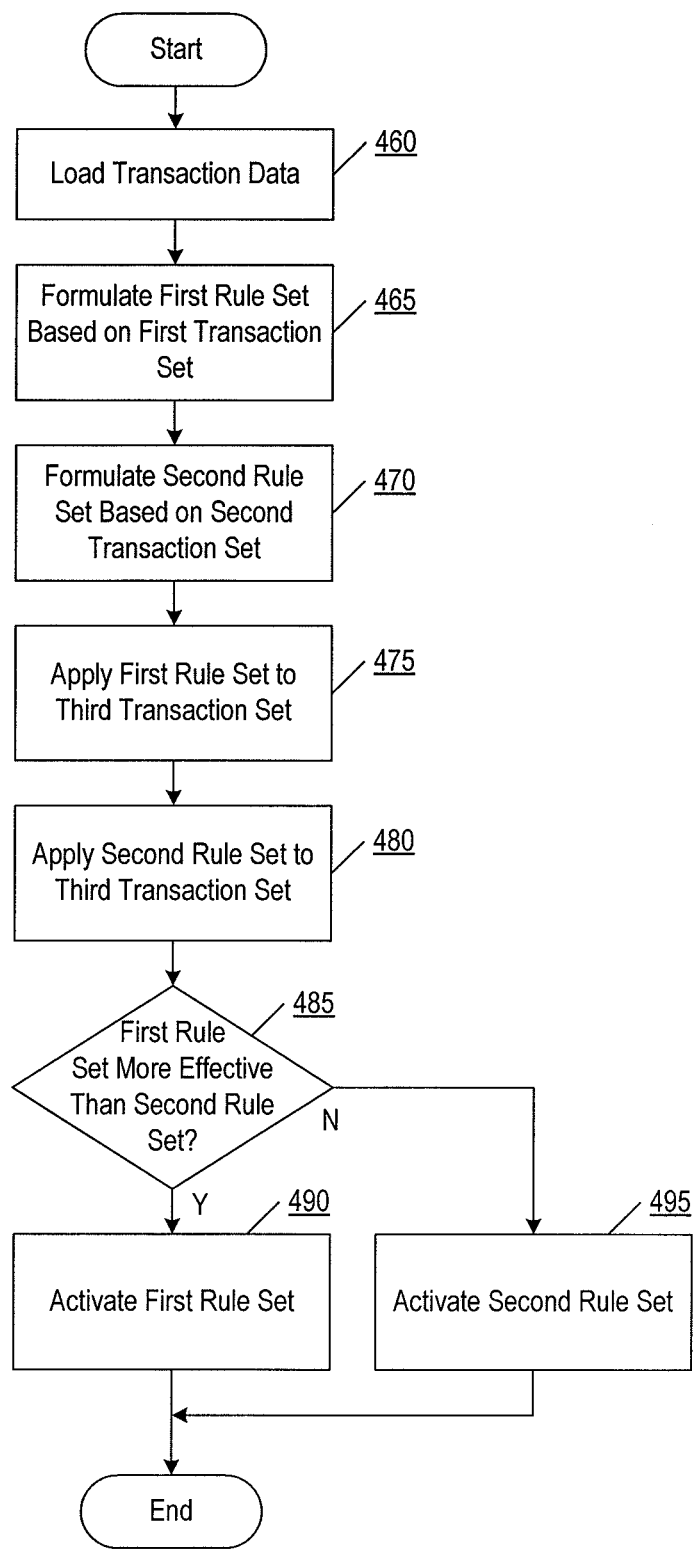
FIG. 4B is a simplified flow diagram that illustrates another method of optimizing fraud rules according to one or more aspects of the disclosure.

FIG. 4B is a simplified flow diagram that illustrates another method of optimizing fraud rules according to one or more aspects of the disclosure. At a high level, in this example method, one or more sets of transactions may be used to formulate fraud rules, and a different set of transactions may be used to validate the fraud rules, where validating the fraud rules may, for instance, involve determining whether the fraud rules should be activated and/or deactivated. In one or more arrangements, the example method of FIG. 4B may be performed by a computing device, such as fraud server computer 101, instead of and/or in addition to the method of FIG. 4A in optimizing fraud rules applied to transactions, for instance.

In step 460, transaction data may be loaded. For example, in step 460, fraud server computer 101 may load transaction data similar to how such transaction data may be loaded in step 405, as described above. Such transaction data may, for instance, include historical information about transactions previously received, authorized, declined, and/or otherwise processed by fraud server computer 101.

In step 465, a first rule set may be formulated based on a first set of transactions included in the transaction data. For example, in step 465, fraud server computer 101 may select a subset of the transactions to be treated as the first set of transactions. Subsequently, fraud server computer 101 may select one or more fraud rules (e.g., from a database of fraud rules) for inclusion in a first set of fraud rules. Selecting the one or more fraud rules for inclusion in the first set of fraud rules may, in some arrangements, be based on how accurately and/or effectively each of the one or more fraud rules would have identified and/or declined fraudulent transactions included in the first set of transactions. For instance, fraud server computer 101 might select a particular rule for inclusion in the first set of fraud rules if the fraud rule would have correctly declined a certain number or percentage of transactions of the first set of transactions in which a fraud event occurred (e.g., if the particular fraud rule's positive hit rate exceeded a predetermined threshold with respect to transactions included in the first set of transactions).

In step 470, fraud server computer 101 may select another subset of transactions to be treated as the second set of transactions. Subsequently, fraud server computer 101 may select one or more fraud rules for inclusion in a second set of fraud rules, similar to how fraud server computer 101 selected one or more fraud rules for inclusion in the first set of fraud rules in step 465. Selection of one or more fraud rules for inclusion in the second set of fraud rules may be based, for instance, on how accurately and/or effectively each of the one or more fraud rules would have identified and/or declined fraudulent transactions included in the second set of transactions.

In step 475, the first set of fraud rules may then be applied to a third set of transactions. For example, in step 475, fraud server computer 101 may select still another subset of transactions to be treated as the third set of transactions. Subsequently, fraud server computer 101 may apply the first set of fraud rules to the third set of transactions to model and/or otherwise determine how the first set of fraud rules would have performed with respect to these transactions. This modeling may include, for instance, determining, with respect to transactions included in the third set of transactions, the hit rate and positive hit rate for each fraud rule included in the first set of fraud rules, as well as the overall hit rate and positive hit rate for the first set of fraud rules.

In step 480, the second set of fraud rules may be applied to the third set of transactions. For example, in step 480, fraud server computer 101 may apply the second set of fraud rules to the third set of transactions to similarly model and/or otherwise determine how the second set of fraud rules would have performed with respect to the third set of transactions. As similar to the modeling in step 475, the modeling in step 480 may include, for instance, determining, with respect to transactions included in the third set of transactions, the hit rate and positive hit rate for each fraud rule included in the second set of fraud rules, as well as the overall hit rate and positive hit rate for the second set of fraud rules.

In step 485, it then may be determined whether the first set of fraud rules is more effective than the second set of fraud rules. For example, in step 485, fraud server computer 101 may compare the overall hit rate and positive hit rate for the first set of fraud rules (as determined with respect to the third set of transactions) to the overall hit rate and positive hit rate for the second set of fraud rules (as also determined with respect to the third set of transactions). If, for instance, the ratio of the overall positive hit rate to the overall hit rate for the first set of fraud rules is higher than the ratio of the overall positive hit rate to the overall hit rate for the second set of fraud rules, then fraud server computer 101 may determine that the first set of fraud rules is more effective than the second set of fraud rules. While this method of evaluation is described as an example of how the first set of fraud rules and the second set of fraud rules might be compared, other methods may be implemented and other factors may be accounted for instead of and/or in addition to the example described above.

If it is determined, in step 485, that the first set of fraud rules is more effective than the second set of fraud rules, then in step 490, the first set of fraud rules may be activated. For example, if fraud server computer 101 determined in step 485 that the first set of fraud rules has a higher positive-hit-rate-to-hit-rate ratio than the second set of fraud rules (e.g., as applied to the third set of transactions), then in step 490, fraud server computer 101 may determine that the first set of fraud rules should be activated and/or may perform other steps, actions, and/or functions to activate the first set of fraud rules (e.g., such that the first set of fraud rules may then be applied to live, incoming transactions received for processing).

On the other hand, if it is determined, in step 485, that the first set of fraud rules is not more effective than the second set of fraud rules, then in step 495, the second set of fraud rules may be activated. For example, if fraud server computer 101 determined in step 485 that the second set of fraud rules has a higher positive-hit-rate-to-hit-rate ratio than the first set of fraud rules (e.g., as applied to the third set of transactions), then in step 495, fraud server computer 101 may determine that the second set of fraud rules should be activated and/or may perform other steps, actions, and/or functions to activate the second set of fraud rules (e.g., such that the second set of fraud rules may then be applied to live, incoming transactions received for processing).

Having described several methods of optimizing fraud rules, several user interfaces via which fraud rules may be managed, defined, and analyzed will now be described with respect to FIGS. 5-7B. According to one or more aspects of the disclosure, any and/or all of these example user interfaces may be displayed by and/or caused to be displayed by a computing device, such as fraud server computer 101.

FIG. 5 is a diagram that illustrates an example user interface screen for managing one or more fraud rules according to one or more aspects of the disclosure. As seen in FIG. 5, user interface 500 may include a plurality of controls that allow a user to manage a plurality of fraud rules. For example, user interface 500 may include a menu bar 505 that allows a user to switch between a "Rule Table" view, which corresponds to the view seen in FIG. 5 in which various fraud rules may be displayed, and a "Rule Editor" view, which corresponds to the view seen in FIG. 6 in which a particular fraud rule may be defined and/or edited. In addition, user interface 500 may include a rule table 510 in which a plurality of fraud rules, and information corresponding thereto, may be displayed. For example, for each fraud rule listed in rule table 510, a name for the fraud rule may be displayed, a salience score (e.g., indicating a priority level for the rule, which may affect the order in which the fraud rules are applied to a particular transaction) may be displayed, a description of the rule may be displayed, an action (e.g., indicating whether a transaction meeting the conditions of the rule should be authorized or denied) for the rule may be displayed, a reason code associated with the rule may be displayed, a status of the rule may be displayed, and an active indicator (e.g., indicating whether the fraud rule is active or inactive) may be displayed.

Figure 6:
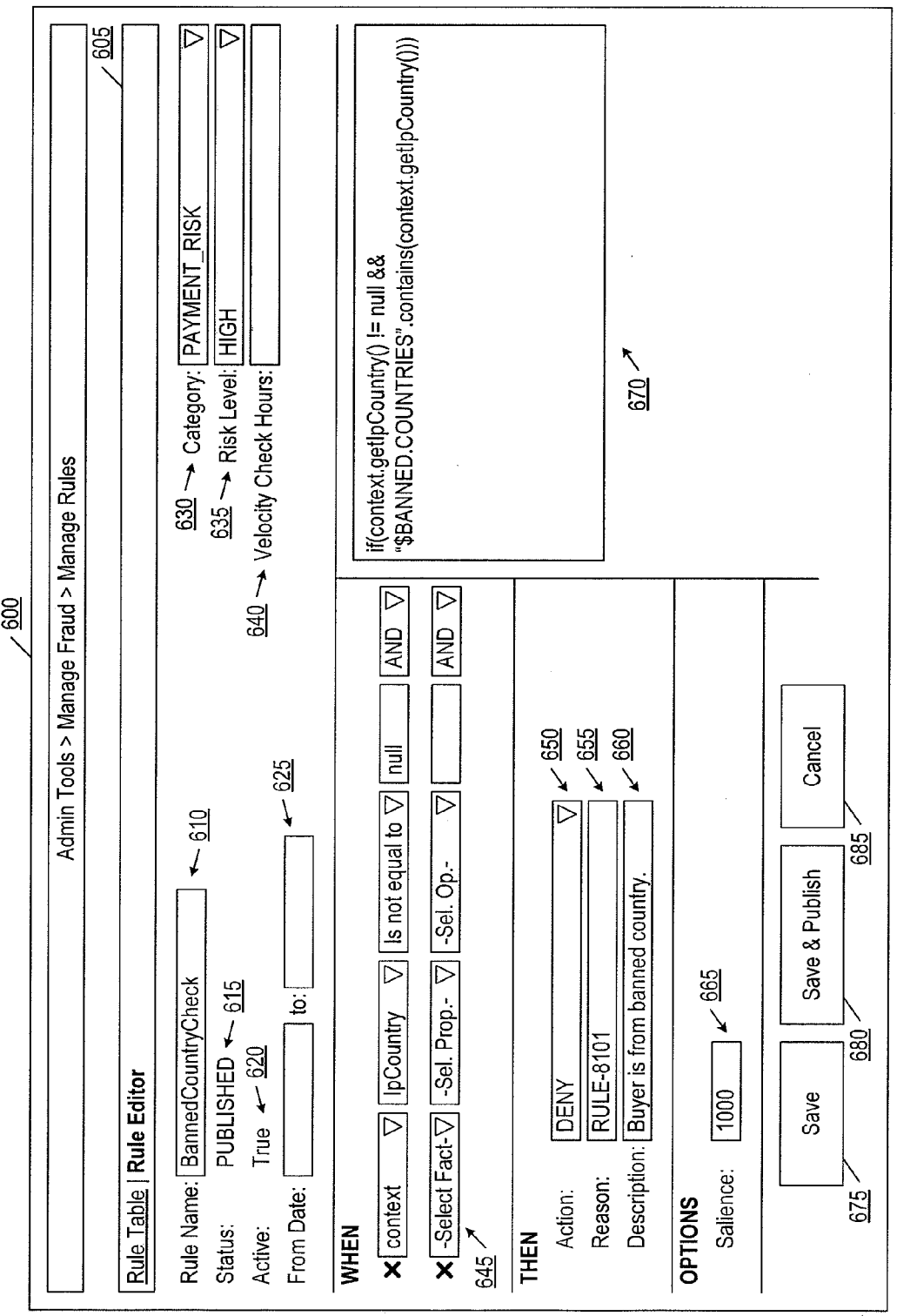
FIG. 6 is a diagram that illustrates an example user interface screen for defining a fraud rule according to one or more aspects of the disclosure.

FIG. 6 is a diagram that illustrates an example user interface screen for defining a fraud rule according to one or more aspects of the disclosure. As seen in FIG. 6, user interface 600 may include a plurality of controls that allow a user to define and/or edit a fraud rule. For example, user interface 600 may include various controls and fields, such as regions 610, 615, 620, 625, 630, 635, and 640, via which a user may enter and define different properties of a fraud rule. In addition, user interface 600 may include a condition definition control 645 via which a user may enter and select one or more conditions that define the fraud rule. Computer code corresponding to the one or more conditions defining the fraud rule may, for instance, be displayed in text box 670.

User interface 600 further may include various controls, such as regions 650, 655, and 660, via which a user may enter and define an action to be taken when the conditions of the fraud rule are met. In addition, user interface 600 may include other controls allowing the user to set other options, such as salience control 665 via which a user may specify a salience score to be assigned to the fraud rule, and several buttons, such as buttons 675, 680, and 685, which may allow a user to save, save and publish, or exit the "Rule Editor" view without saving changes, respectively.

FIG. 7A is a diagram that illustrates an example user interface screen for viewing a fraud report according to one or more aspects of the disclosure. As seen in FIG. 7A, user interface 700 may include information about one or more fraudulent transactions. User interface 700 may include, for instance, one or more controls 705 via which a user may specify which fraudulent transactions should be displayed, as well as a fraud table 710, in which information about various fraudulent transactions may be displayed. Such information may include the date each fraudulent transactions occurred, an identifier for the user associated with each fraudulent transactions, an IP address associated with each fraudulent transactions, as well as a country, currency, and action code associated with each fraudulent transactions.

Figure 7B:
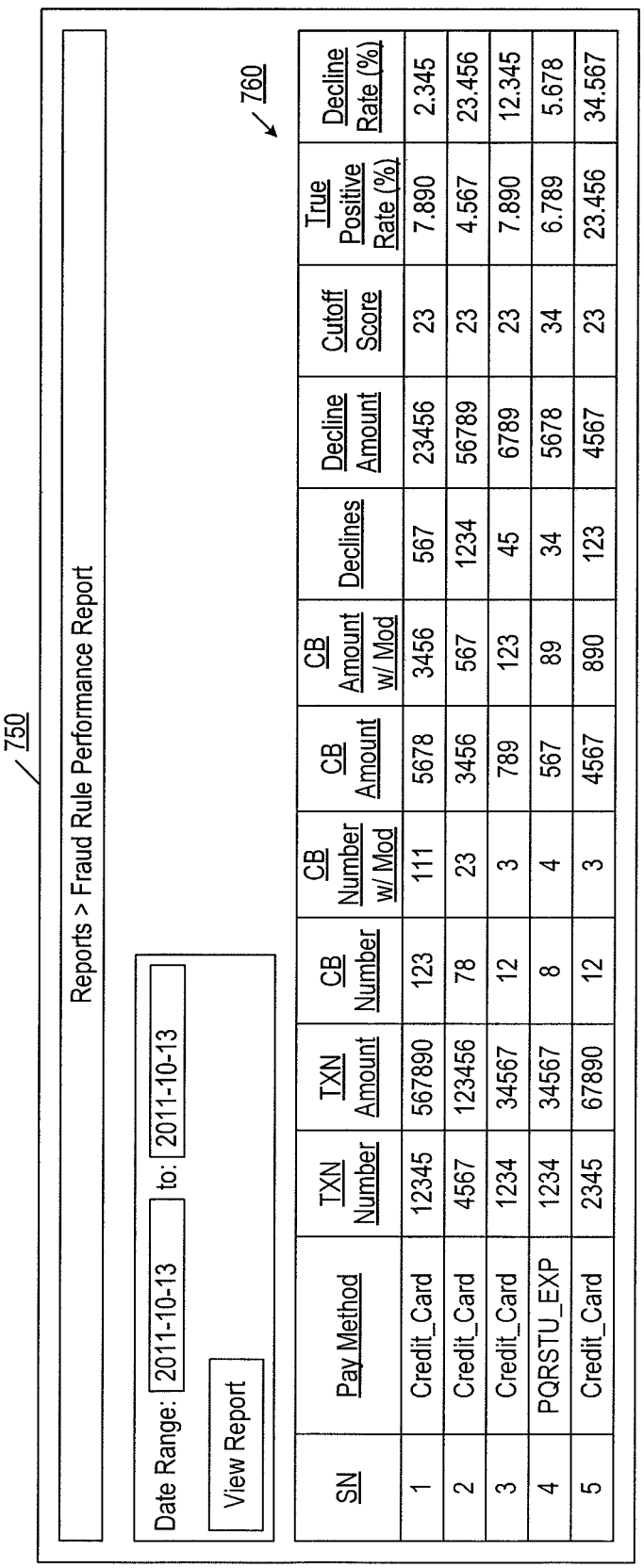
FIG. 7B is a diagram that illustrates an example user interface screen for viewing a fraud rule performance report according to one or more aspects of the disclosure.

FIG. 7B is a diagram that illustrates an example user interface screen for viewing a fraud rule performance report according to one or more aspects of the disclosure. As seen in FIG. 7B, user interface 750 may include information about the performance of one or more fraud rules and/or one or more transactions. For example, user interface 750 may include a rule performance table 760, in which performance information for one or more fraud rules is presented. For each fraud rule included in the rule performance table 760, the table may include information about the payment method to which the rule applies (e.g., whether the rule applies to credit card transactions, debit card transactions, online payment transactions, etc.), the number of transactions to which the rule could have been applied, the total monetary amount involved in all of the transactions to which the rule could have been applied, the number of chargebacks (and/or other fraud events) that have occurred in connection with transactions that would have been allowed by the rule, the number of chargebacks (and/or other fraud events) that have occurred in connection with transactions that would have been allowed by the rule and would not have been selected for inclusion in a control group of transactions to which no fraud rules were applied, the total monetary amount involved in all of the chargebacks, the number of transactions that would have have been declined by operation of the rule, the total monetary amount involved in all of the transactions that would have been declined by operation of the rule, a threshold for the positive hit rate above which the particular fraud rule may be activated, the true positive rate for the fraud rule (which may, for instance, correspond to the positive hit rate for the fraud rule, as described elsewhere herein), and/or the decline rate for the fraud rule (which may, for instance, correspond to the hit rate for the fraud rule, as described elsewhere herein). Other fields may similarly be included, as may be desired, instead of and/or in addition to those illustrated in this example. In addition, by generating, reviewing, and analyzing such a report, the performance of one or more inactive fraud rules, for instance, may be modeled and evaluated so as to determine whether one or more particular inactive fraud rules should be activated (e.g., based on the accuracy and/or effectiveness of the fraud rule, as determined based on the transaction data).

Various embodiments of the invention, as described above, have a number of advantages. For example, by processing a plurality of transactions without applying one or more active fraud rules, a baseline level of fraudulent activity may be determined, and the accuracy and effectiveness of one or more fraud rules may be determined and/or otherwise evaluated in view of this baseline level of fraudulent activity. Advantageously, this understanding may allow a payment processing network, for instance, to make better and more informed decisions about implementing fraud rules in transaction processing.

For instance, in one or more arrangements, a hit rate and a positive hit rate for a fraud rule may be determined. The hit rate may represent transactions of the plurality of transactions that would have been declined by operation of the fraud rule if the fraud rule had been applied during processing. The positive hit rate may represent a subset of these transactions (e.g., a subset of the transactions that would have been declined) that actually resulted in a fraud event, such as a chargeback. As described above, by determining and comparing the hit rate and the positive hit rate for a particular fraud rule, one may gain an understanding of how effectively the particular fraud rule identifies (and, when the fraud rule is actively applied to transactions, prevents) fraudulent transactions. In addition, by determining and comparing the hit rate and the positive hit rate for a particular fraud rule, one may gain an understanding of how often (if at all) the fraud rule causes legitimate transactions to be declined. Advantageously, by understanding these characteristics of a particular fraud rule, an organization, such as a financial institution or a payment processing network, may adjust and optimize which fraud rules are used to authorize and decline transactions, and which are not.

Embodiments of the invention provide still additional advantages. For example, by randomly selecting which transactions are included in the plurality of transactions that are processed without fraud rules, a payment processing network can prevent fraudsters from exploiting vulnerabilities that may be created by processing some transactions without fraud rules. In particular, if fraudsters were to recognize patterns in which transactions were selected for inclusion in the control group of transactions (e.g., the plurality of transactions processed without fraud rules), the fraudsters might be able to exploit this recognition and route greater numbers of transactions into the control group. Advantageously, by randomly selecting transactions for inclusion in the control group, the risk of this type of exploitation may be reduced.

In other embodiments, received transactions that are associated with one or more known fraudulent elements (e.g., known fraudulent users and/or user identifiers, known fraudulent Internet addresses, known fraudulent account numbers, etc.) may be prevented from being included in the control group. Advantageously, excluding transactions that are associated with one or more known fraudulent elements in this manner may further reduce the risk of fraudsters exploiting the vulnerabilities that may be created by processing some transactions without fraud rules. Another advantage provided by this embodiment is that the baseline level of fraudulent activity captured by control group of transactions represents new fraudulent activity, rather than old, known fraudulent activity.

In additional and/or alternative embodiments, such as embodiments in which transactions are divided into and/or categorized by different transaction segments, a particular number of transactions from each transaction segment may be proportionally selected for inclusion in the control group based on the size of each transaction segment in relation to the total number of transactions. Advantageously, selecting transactions in this manner may result in the control group more accurately reflecting the entirety of all transactions received for processing, as the relative size of each transaction segment in the control group can match the relative size of each transaction segment in the group of all transactions received for processing.

Additional embodiments of the invention provide yet more advantages. For example, in some embodiments, it may be determined (e.g., by a fraud server computer) to deactivate a particular active fraud rule in response to determining that the ratio of the fraud rule's positive hit rate to the fraud rule's hit rate falls below a predetermined threshold amount. Advantageously, this type of automatic deactivation of fraud rules may allow a fraud server computer (and correspondingly, a payment processing network operating the fraud server computer) to dynamically adjust and/or optimize fraud rules by automatically deactivating fraud rules that are determined to be inaccurate or ineffective when it comes to identifying and declining fraudulent transactions. Thus, the fraud server computer may not only become more accurate in identifying and declining fraudulent transactions, but also may adjust itself automatically and in real-time, providing more convenience to the payment processing network operating the fraud server and the accountholders attempting transactions through the network, as well as more efficient responsiveness to changes in the effectiveness of various fraud rules than could be achieved manually, for instance.

In other additional and/or alternative embodiments, it may be determined to activate a particular inactive fraud rule in response to determining that the ratio of the fraud rule's positive hit rate to the fraud rule's hit rate exceeds a predetermined threshold amount. Advantageously, this type of automatic activation of fraud rules may allow a fraud server computer (and correspondingly, a payment processing network operating the fraud server computer) to dynamically adjust and/or optimize fraud rules by automatically activating fraud rules that are determined to be accurate and/or effective in identifying and declining fraudulent transactions, similar to how automatic deactivation of rules may provide the advantages discussed above. Thus, in these embodiments, the accuracy, efficiency, and convenience provided by a system implementing various aspects of the disclosure (e.g., fraud server computer 101) may be further enhanced.

Embodiments implementing these and other features, including various combinations of the features described herein, may provide the advantages discussed above and/or other additional advantages.

Further aspects of embodiments of the invention may be found in U.S. Provisional Patent Application Ser. No. 61/456, 118, filed on Nov. 2, 2010, and entitled "Software, Method, and System for Monetization as a Service," which is incorporated by reference herein in its entirety for all purposes.

Figure 8:
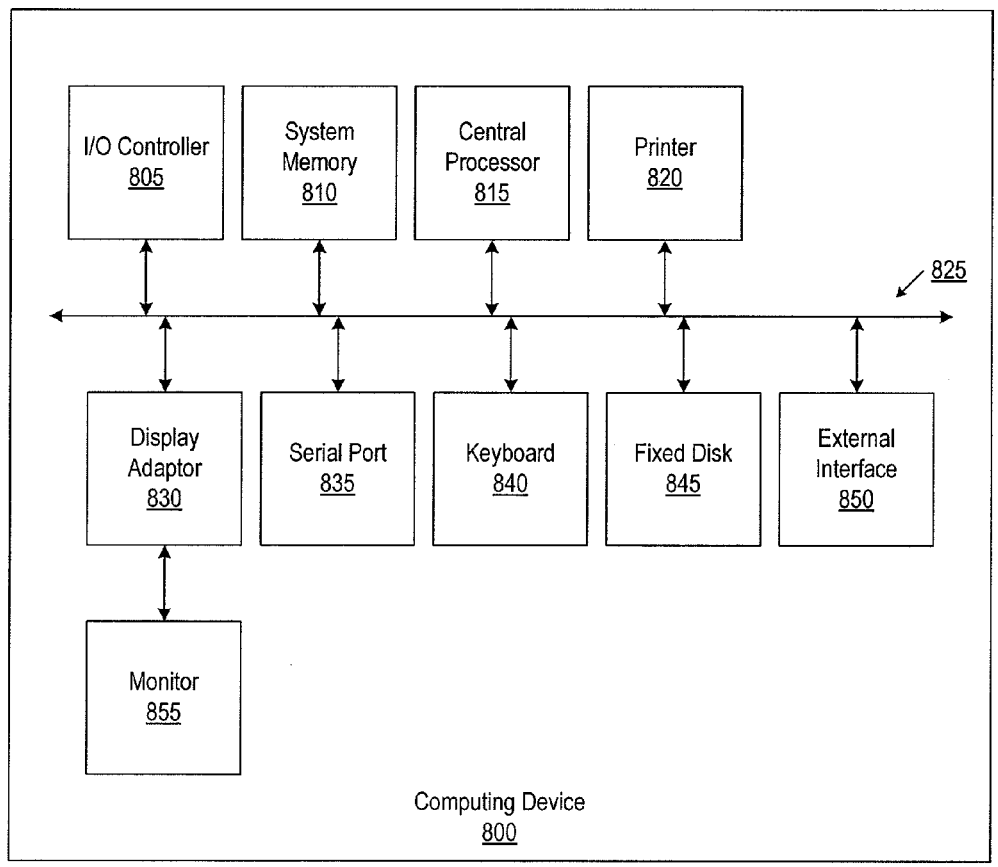
FIG. 8 is a simplified block diagram that illustrates an example of a computer apparatus in which various aspects of the disclosure may be implemented.

FIG. 8 is a simplified block diagram that illustrates an example of a computing device in which various aspects of the disclosure may be implemented. The various participants and elements in the previously described system diagrams (e.g., fraud server computer 101, rules engine 105, optimization engine 110, transaction monitoring module 115, randomizer 120, etc. in FIGS. 1B and 2) may use any suitable number of subsystems in the computing device to facilitate the functions described herein. Examples of such subsystems or components are shown in FIG. 8. The subsystems shown in FIG. 8 are interconnected via a system bus 825. Additional subsystems such as a printer 820, keyboard 840, fixed disk 845 (or other memory comprising computer-readable media), monitor 855, which is coupled to display adapter 830, and others are shown. Peripherals and input/output (I/O) devices (not shown), which couple to I/O controller 805, can be connected to the computer system by any number of means known in the art, such as serial port 835. For example, serial port 835 or external interface 850 can be used to connect the computer apparatus to a wide area network such as the Internet, a mouse input device, or a scanner. The interconnection via system bus 825 allows the central processor 815 to communicate with each subsystem and to control the execution of instructions from system memory 810 or the fixed disk 845, as well as the exchange of information between subsystems. The system memory 810 and/or the fixed disk 845 may embody a computer-readable medium.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Aspects of the disclosure can be implemented in the form of control logic in software or hardware or a combination of both. The control logic may be stored in an information storage medium as a plurality of instructions adapted to direct an information processing device to perform a set of steps disclosed herein. Based on the disclosure and teachings provided herein, a person of ordinary skill in the art will appreciate other ways and/or methods to implement the present invention.

In some embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of aspects of the disclosure will become apparent to those skilled in the art upon review of the disclosure. The scope of the disclosure should, therefore, be determined not with reference to the above description, but instead should be determined with reference to the appended claims along with their full scope or equivalents.

What is claimed is:

1. A method, comprising:
    processing, by at least one computing device, a plurality of transactions without applying one or more active fraud rules, wherein each transaction of the plurality of transactions is selected from a larger plurality of received transactions by the at least one computing device executing a random selection algorithm for inclusion in the plurality of transactions to be processed without application of the one or more active fraud rules;

allowing the plurality of transactions to be authorized when the one or more active fraud rules indicate one or more of the transactions as fraudulent;

determining, by the at least one computing device, based on the plurality of transactions a hit rate for at least one fraud rule of the one or more active fraud rules, wherein the hit rate represents a first set of transactions of the plurality of transactions that would be declined by operation of the at least one fraud rule if the at least one fraud rule had been applied during the processing;

determining, by the at least one computing device, based on fraud event data corresponding to the plurality of transactions, a positive hit rate for the at least one fraud rule;

wherein the positive hit rate represents a second set of transactions corresponding to one or more transactions of the first set that resulted in at least one fraud event;

deactivating, by the at least one computing device, the at least one fraud rule in response to determining that a ratio of the positive hit rate to the hit rate is less than a predetermined threshold amount; and allowing subsequent transactions to be authorized without applying the deactivated at least one fraud rule.

2. The method of claim 1, wherein received transactions associated with one or more known fraudulent elements are prevented from being included in the plurality of transactions to be processed without application of the one or more active fraud rules.

3. The method of claim 2, wherein the one or more known fraudulent elements include at least one known fraudulent user identifier, at least one known fraudulent Internet address, at least one known fraudulent account number, at least one known fraudulent card number, at least one known fraudulent phone number, at least one known fraudulent billing address, or at least one known fraudulent device fingerprint.

4. The method of claim, 1,
wherein each received transaction corresponds to a particular transaction segment of a plurality of transaction segments, and
wherein a first number of received transactions corresponding to a first transaction segment are selected for inclusion in the plurality of transactions to be processed without application of the one or more active fraud rules based on a size of the first transaction segment relative to the plurality of transaction segments.

5. The method of claim 1, further comprising:
determining, by the at least one computing device, based on the plurality of transactions, a second hit rate for at least one inactive fraud rule;
determining, by the at least one computing device, based on the fraud event data, a second positive hit rate for the at least one inactive fraud rule; and
determining, by the at least one computing device, to activate the at least one inactive fraud rule in response to determining that a ratio of the second positive hit rate to the second hit rate is greater than a predetermined threshold amount.

6. The method of claim 5, further comprising:
determining, by the at least one computing device, to deactivate the at least one fraud rule in response to determining that a ratio of the positive hit rate to the hit rate is less than a second predetermined threshold amount, wherein the second predetermined threshold amount is different than the predetermined threshold amount used for activating the at least one inactive fraud rule.

7. The method of claim 1, wherein the fraud event data indicates whether a chargeback occurred for each transaction in the plurality of transactions.

8. The method of claim 1,
wherein the larger plurality of received transactions are sorted into a plurality of transaction segments, and
wherein a number of transactions in each transaction segment selected for inclusion in the plurality of transactions to be processed without application of the one or more active fraud rules is in proportion to the relative size of each transaction segment in the larger plurality of transactions.

9. The method of claim 8,
wherein the larger plurality of received transactions are sorted into the plurality of transaction segments according to the originating country of each received transaction.

10. An apparatus, comprising:
at least one processor; and
memory storing computer-readable instructions that, when executed by the at least one processor, cause the apparatus to:
process a plurality of transactions without applying one or more active fraud rules, wherein each transaction of the plurality of transactions is selected from a larger plurality of received transactions by a random selection algorithm for inclusion in the plurality of transactions to be processed without application of the one or more active fraud rules;
allow the plurality of transactions to be authorized when the one or more active fraud rules indicate one or more of the transactions as fraudulent;
determine, based on the plurality of transactions, a hit rate for at least one fraud rule of the one or more active fraud rules, wherein the hit rate represents a first set of transactions of the plurality of transactions that would be declined by operation of the at least one fraud rule if the at least one fraud rule had been applied during the processing;
determine, based on fraud event data corresponding to the plurality of transactions, a positive hit rate for the at least one fraud rule, wherein the positive hit rate represents a second set of transactions corresponding to one or more transactions of the first set that resulted in at least one fraud event;
deactivate, the at least one fraud rule in response to determining that a ratio of the positive hit rate to the hit rate is less than a predetermined threshold amount; and
allowing subsequent transactions to be authorized without applying the deactivated at least one fraud rule.

11. The apparatus of claim 10, wherein received transactions associated with one or more known fraudulent elements are prevented from being included in the plurality of transactions to be processed without application of the one or more active fraud rules.

12. The apparatus of claim 11, wherein the one or more known fraudulent elements include at least one known fraudulent user identifier, at least one known fraudulent Internet address, at least one known fraudulent account number, at least one known fraudulent card number, at least one known fraudulent phone number, at least one known fraudulent billing address, or at least one known fraudulent device fingerprint.

13. The apparatus of claim 10,
wherein each received transaction corresponds to a particular transaction segment of a plurality of transaction segments, and wherein a first number of received transactions corresponding to a first transaction segment are selected for inclusion in the plurality of transactions to be processed without application of the one or more active fraud rules based on a size of the first transaction segment relative to the plurality of transaction segments.

14. The apparatus of claim 10, wherein the memory stores additional computer-readable instructions that, when executed by the at least one processor, further cause the apparatus to:
determine, based on the plurality of transactions, a second hit rate for at least one inactive fraud rule;
determine, based on the fraud event data, a second positive hit rate for the at least one inactive fraud rule; and
determine to activate the at least one inactive fraud rule in response to determining that a ratio of the second positive hit rate to the second hit rate is greater than a predetermined threshold amount.

15. The apparatus of claim 14, wherein the memory stores additional computer-readable instructions that, when executed by the at least one processor, further cause the apparatus to:
determine to deactivate the at least one fraud rule of the one or more active fraud rules in response to determining that a ratio of the positive hit rate to the hit rate is less than a second predetermined threshold amount,
wherein the second predetermined threshold amount is different than the predetermined threshold amount used for activating the at least one inactive fraud rule.

16. The apparatus of claim 10, wherein the fraud event data indicates whether a chargeback occurred for each transaction in the plurality of transactions.

17. The apparatus of claim 10,
wherein the larger plurality of received transactions are sorted into a plurality of transaction segments, and wherein a number of transactions in each transaction segment selected for inclusion in the plurality of transactions to be processed without application of the one or more active fraud rules is in proportion to the relative size of each transaction segment in the larger plurality of transactions.

18. The apparatus of claim 17,
wherein the larger plurality of received transactions are sorted into the plurality of transaction segments according to the originating country of each received transaction.

19. A payment processing server, comprising:
at least one processor; and
memory storing computer-readable instructions that, when executed by the at least one processor, cause the payment processing server to:
process a plurality of transactions without applying one or more active fraud rules, wherein each transaction of the plurality of transactions is selected from a larger plurality of received transactions by a random selection algorithm for inclusion in the plurality of transactions to be processed without application of the one or more active fraud rules;
allow the plurality of transactions to be authorized when the one or more active fraud rules indicate one or more of the transactions as fraudulent;
determine a hit rate, based on the plurality of transactions, for at least one fraud rule of the one or more active fraud rules;
determine, based on the plurality of transactions, a hit rate for at least one fraud rule of the one or more active fraud rules, wherein the hit rate represents a first set of transactions of the plurality of transactions that would have been declined by operation of the at least one fraud rule if the at least one fraud rule had been applied during the processing;
determine, based on fraud event data corresponding to the plurality of transactions, a positive hit rate for the at least one fraud rule, wherein the positive hit rate represents a second set of transactions corresponding to one or more transactions of the first set that resulted in at least one fraud event;
deactivate, the at least one fraud rule in response to determining that a ratio of the positive hit rate to the hit rate is less than a predetermined threshold amount; and
allowing subsequent transactions to be authorized without applying the deactivated at least one fraud rule.

20. The payment processing server of claim 19, wherein the memory stores additional computer-readable instructions that, when executed by the at least one processor, further cause the payment processing server to:
determine, based on the plurality of transactions, a second hit rate for at least one inactive fraud rule;
determine, based on the fraud event data, a second positive hit rate for the at least one inactive fraud rule; and
determine to activate the at least one inactive fraud rule in response to determining that a ratio of the second positive hit rate to the second hit rate is greater than a second predetermined threshold amount.

21. The payment processing server of claim 20, wherein the first predetermined threshold is different than the second predetermined threshold amount.

* * * * *